(12) United States Patent
Graber

(10) Patent No.: US 9,968,039 B2
(45) Date of Patent: May 15, 2018

(54) HYDROPONIC TOWER ASSEMBLY

(71) Applicant: Loren R. Graber, Nappanee, IN (US)

(72) Inventor: Loren R. Graber, Nappanee, IN (US)

( * ) Notice: Subject to any disclaimer, the term of this patent is extended or adjusted under 35 U.S.C. 154(b) by 0 days. days.

(21) Appl. No.: 14/822,070

(22) Filed: Aug. 10, 2015

(65) Prior Publication Data

US 2016/0050863 A1   Feb. 25, 2016

Related U.S. Application Data

(60) Provisional application No. 62/040,255, filed on Aug. 21, 2014.

(51) Int. Cl.
*A01G 31/06* (2006.01)
*A01G 9/02* (2018.01)
*A01G 31/02* (2006.01)

(52) U.S. Cl.
CPC .............. *A01G 31/06* (2013.01); *A01G 9/023* (2013.01); *A01G 31/02* (2013.01); *Y02P 60/216* (2015.11)

(58) Field of Classification Search
CPC ........ A01G 31/06; A01G 31/02; A01G 9/023; A01G 9/022; Y02P 60/216
See application file for complete search history.

(56) References Cited

U.S. PATENT DOCUMENTS

| | | | | |
|---|---|---|---|---|
| 2,943,600 A | * | 7/1960 | Rosoff | A01K 39/012 119/464 |
| 3,188,771 A | * | 6/1965 | Ballai | A01G 9/00 47/47 |
| 4,033,072 A | * | 7/1977 | Kobayashi | A01G 31/06 47/62 R |
| 4,828,209 A | * | 5/1989 | Niemi | F16B 19/1081 248/220.42 |
| 5,265,376 A | * | 11/1993 | Less | A01G 9/022 47/83 |
| 5,372,094 A | * | 12/1994 | Zens | A01K 39/012 119/430 |
| 5,555,676 A | * | 9/1996 | Lund | A01G 9/022 47/82 |
| 6,408,570 B1 | * | 6/2002 | Shih | A01G 31/02 47/79 |
| 6,408,788 B1 | * | 6/2002 | Lieb | A01K 39/012 119/52.2 |
| 7,032,539 B1 | * | 4/2006 | Obenshain | A01K 39/012 119/52.2 |
| 7,055,282 B2 | | 6/2006 | Bryan, III | |
| 7,171,782 B2 | * | 2/2007 | Felknor | A01G 9/102 47/65.5 |
| 7,610,876 B1 | * | 11/2009 | Schulz | A01K 39/012 119/57.8 |
| 8,136,296 B2 | * | 3/2012 | Hogan | A01G 27/003 47/39 |
| 8,365,466 B1 | | 2/2013 | Storey | |
| 2015/0296726 A1 | * | 10/2015 | Higgins | A01K 63/00 47/62 R |

FOREIGN PATENT DOCUMENTS

WO   WO 2016/081234   5/2016

* cited by examiner

*Primary Examiner* — Joshua D Huson
(74) *Attorney, Agent, or Firm* — Barnes & Thornburg LLP

(57) ABSTRACT

A hydroponic tower for growing fruits, vegetables, herbs, flowers, and/or other plants. The tower illustratively includes a substantially vertically-oriented tube with an inlet end and a drain end. The tube defines a plurality of openings for receiving a plurality of cups that can be added to and removed from the tube as desired.

10 Claims, 1 Drawing Sheet

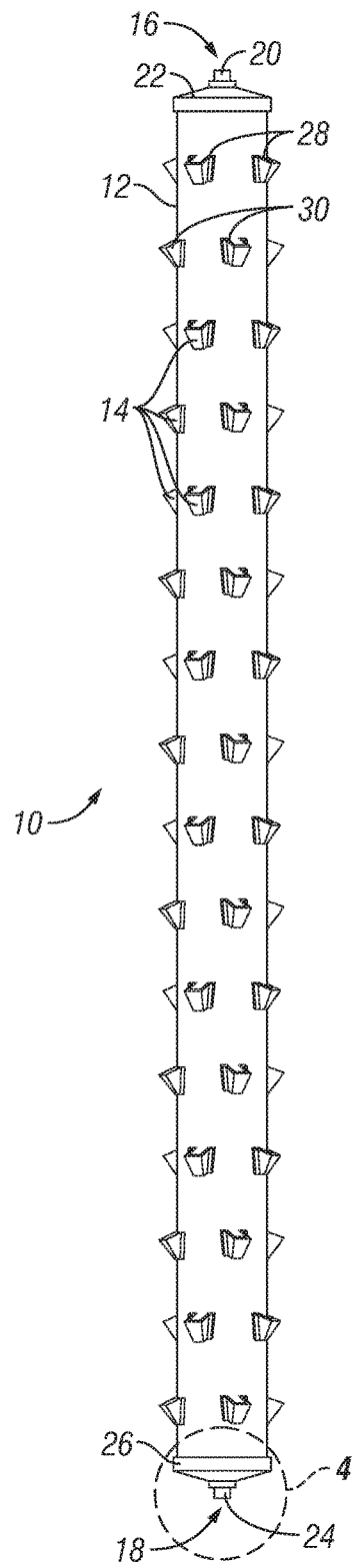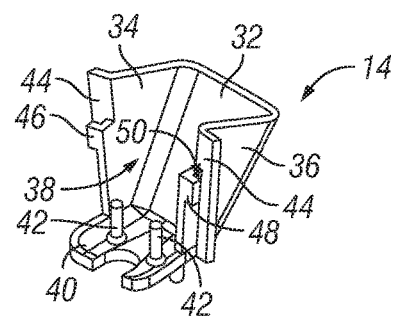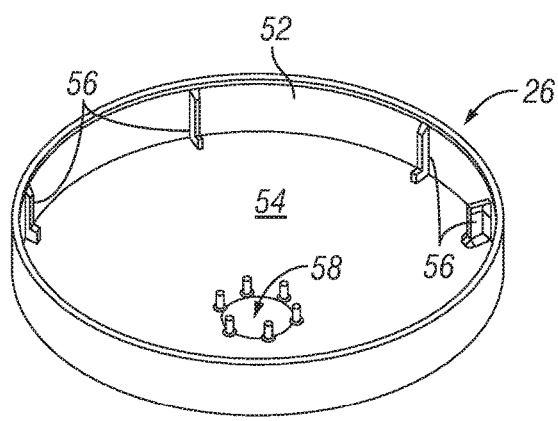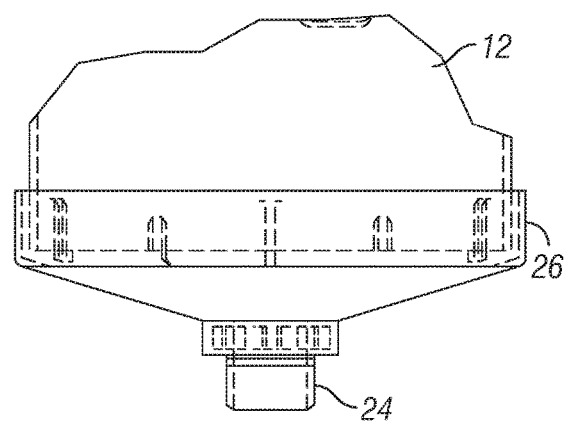

HYDROPONIC TOWER ASSEMBLY

RELATED APPLICATIONS

The present application is related to and claims priority to U.S. Provisional Patent Application Ser. No. 62/040,255, filed on Aug. 21, 2014, entitled "Hydrophonic Tower Assembly." The subject matter disclosed in that provisional application is hereby expressly incorporated into the present application in its entirety.

BACKGROUND

This disclosure relates to hydroponic growing systems; in particular, this disclosure relates to a hydroponic growing system configured in a tower assembly.

SUMMARY

This disclosure relates to a hydroponic growing system that is oriented in a vertical tower-like configuration. In one embodiment, the tower includes a plurality of openings into which cups with growing medium can be attached and removed when desired. The cups illustratively include an open back side with sidewalls that can be resiliently squeezed together and inserted into the openings in the tower and released to form an interference fit that allows the cups to be added and removed as desired.

BRIEF DESCRIPTION OF THE DRAWINGS

The present disclosure will be described hereafter with reference to the attached drawings which are given as non-limiting examples only, in which:

FIG. 1 is a side view of an example hydroponic tower according to an embodiment of the present disclosure;

FIG. 2 is a perspective view of an example cup for use in the hydroponic tower according to an embodiment of the present disclosure;

FIG. 3 is a perspective view of an example end cap for use in the hydroponic tower according to an embodiment of the present disclosure; and FIG. 4 is an enlarged view of the area indicated as "4" in FIG. 1.

Corresponding reference characters indicate corresponding parts throughout the several views. The components in the figures are not necessarily to scale, emphasis instead being placed upon illustrating the principals of the invention. The exemplification set out herein illustrates embodiments of the invention, and such exemplification is not to be construed as limiting the scope of the invention in any manner.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure.

The present disclosure relates to hydroponic growing systems, such as growing fruits, vegetables, herbs, flowers, and other plants. FIG. 1 is a side view of an example hydroponic tower 10 for growing plants in a vertically-oriented arrangement. In this example, the hydroponic tower 10 includes a tube 12 containing a plurality of openings into which cups 14 can be received. In one embodiment, the cups 14 are removably attached to the tube 12. As shown, the hydroponic tower 10 includes an inlet end 16 and a drain end 18. The inlet end 16 includes an inlet pipe 20 that is received in an end cap 22, which is attached to the inlet end 16 of the tube 12. The drain end 18 includes a drain pipe 24 that is received in an end cap 26, which is attached to the drain end 18 of the tube 12. In this example, the water (or other nutrient enhanced fluid) flows into the inlet end 16 through the inlet pipe 20 through the tube 12 to hydrate the plants in the cups 14 and exits out the drain pipe 24. This water could then be recirculated to the inlet pipe 20. One skilled in the art should appreciate that other water flow arrangements could be used. For example, the water could be pumped through an internal pipe that extends (not shown) from the drain end 18 up to the inlet end 16 and flow through the tube 12 via gravity 18 and exit the tube through the drain end 18. One skilled in the art should also appreciate that multiple hydroponic towers 10 could be arranged together with a common inlet line that is connected to the inlet pipe 20 to supply a flow of water and exits the drain pipe 24 to a common drain line, which is recirculated back to the inlet pipe 20.

The tube 12 could be made of a polyvinyl chloride ("PVC") pipe, aluminum pipe or other suitable pipe material. By way of example only, the tube 12 may be approximately 120 inches (about 304.8 cm) in length and approximately 8.165 inches (20.74 cm) outer diameter. In some cases, the openings for receiving the cups 14 could be routed out of the tube 12. In the example shown, cups 14 are arranged on the tube 12 in spaced apart groups of cups 14 along an axis transverse to the longitudinal axis of the tube 12. As shown, the hydroponic tower 10 includes a first group 28 of cups 14 approximately coplanar along a transverse axis to the longitudinal axis of the tube 12 and a second group 30 of cups 14 approximately coplanar along a transverse axis to the longitudinal axis of the tube 12. In the example shown, the cups 14 in the first group 28 are angularly offset with respect to the second group 30 of cups 14. This pattern of cup groupings repeats from the inlet end 16 to the drain end 18 of the tube 12 with every other group in-line with the first group or second group, respectively. In one embodiment, the groups of cups are spaced apart by approximately 7.25 inches (18.415 cm). However, one skilled in the art should appreciate many different arrangements and spacing for the cups on the tube 12 are possible and this disclosure is not intended to be limited to the particular arrangement shown in FIG. 1.

FIG. 2 shows an example cup 14 that could be used with the hydroponic tower 10. The cup 14 is configured to hold a plant to be grown in the hydroponic tower 10. In the embodiment shown, the cup 14 is configured to be removably attached through an opening in the tube 12. In the example shown, the cup 14 has a front wall 32 from which a first side wall 34 and a second side wall 36 extend and an open back side 38. A base wall 40 includes one or more prongs 42 on which a plant (not shown) may be received. For example, growing media for the plant could be attached to the cup 14 with the prongs 42 using a frictional fit.

In the example shown, flanges 44 extend outwardly in a transverse direction from the first side wall 34 and second side wall 36. A first catch 46 extends from the first side wall 34 and a second catch 48 extends from the second side wall 36. The catches 46, 48 are configured to engage the edge of the opening on the tube 12 to create an interference coupling between the cup 14 and the tube 12. The side walls 34, 36 are formed from resilient materials, such as PVC or aluminum, and can be moved towards each other so the catches 46, 48 can be inserted into an opening in the tube 12, which allows the catches 46, 48 to engage the edge of the opening in the tube 12. When the user releases the side walls, the walls 34, 36 resiliently move back and an interference fit is formed between the catches 46, 48 and the edge of the opening in the tube 12. There is a space 50 between the catches 46, 48 and respective flanges 44 for the edge of the tube's opening to be received when the cup 14 is attached to the tube 12. In the embodiment shown, the front wall 32 is angled with respect to the longitudinal axis of the tube 12. This creates an opening for the plant between the tube 12 and walls 32, 34, 36 when the cup 14 is attached to the tube 12.

FIG. 3 shows an example end cap 26 according to an embodiment of the disclosure. In the example shown, the end cap 26 includes a circumferential rim 52 sized to receive an end 16, 18 of the tube 12. As shown, a plurality of ribs 54 extend radially inward from the rim 52. The ribs 54 are configured to be received by corresponding slots formed in the ends 16, 18 of the tube 12. This allows an interference fit between the end cap 26 and tube 12. The end cap 26 includes a frustoconical-shaped base wall 54 extending from the rim 52 that terminates with an opening 56 dimensioned to receive the inlet pipe 20 or drain pipe 24 depending on where the end cap 26 is installed. In the example shown, the frustoconically-shaped base wall 54 funnels water via gravity towards the opening 56.

FIG. 4 is an enlarged view of the portion circled in FIG. 1, which is identified by reference number 4. This shows the side of the end cap 26 and drain pipe 24 connection. Water flows out of the drain pipe 24 and can be recirculated to the inlet pipe 20, as desired.

In operation, with the embodiment shown, the user would attach growing medium with one or more seeds to a cup 14 using the prongs 42 for a plurality of cups 14. These cups would be attached to various openings in the tube 12. The user would attach the cups 14 by squeezing the sidewalls 34, 36 towards each other and insert the catches 46, 48 into the opening. The user would then release the sidewalls 34, 36, which would resiliently engage the catches 46, 48 with the edge of the opening in the tube 12. The user would connect a water supply to the inlet pipe 20, and if desired, attach a pipe to recirculate the water from the drain pipe 24 to the inlet pipe 20.

Although the present disclosure has been described with reference to particular means, materials, and embodiments, from the foregoing description, one skilled in the art can easily ascertain the essential characteristics of the invention and various changes and modifications may be made to adapt the various uses and characteristics without departing from the spirit and scope of the invention.

What is claimed:

1. A hydroponic tower comprising:
    a substantially vertically-oriented tube having an inlet end and a drain end, wherein the tube defines a plurality of openings;
    a plurality of cups arranged on the tube such that each cup is removably attached to a respective opening of the plurality of openings in the tube;
    wherein at least a portion of the plurality of cups include a substantially planar front wall spaced apart from the tube when attached to the tube, a resilient first side wall, a resilient second side wall extending from the front wall, and a substantially planar base wall including at least one prong extending transversely and upwardly therefrom for receiving a plant, wherein the first side wall and the second side wall are spaced apart by an open back side of the cup, a first flange extending transversely from the first side wall and a second flange extending transversely from the second side wall;
    wherein the first side wall includes a first catch extending transversely from the first side wall and the second side wall includes a second catch extending transversely from the second side wall, the first catch extending substantially parallel to and spaced apart from the first flange to receive a first portion of the tube therebetween and the second catch extending substantially parallel to and spaced apart from the second flange to receive a second portion of the tube therebetween,
    wherein the first catch and the second catch are movable towards each other to reduce a width of the open back side to extend the first catch and the second catch through a respective opening of the plurality of openings to create an interference fit between the respective cup of the plurality of cups and the tube but movement of the first catch and the second catch into the opening in the tube is limited by the first flange and the second flange such that the first catch and the second catch extend into the tube when the cup is attached to the tube, but the first flange and the second flange extend outside the tube;
    wherein the front wall is angled with respect to a longitudinal axis of the tube to define an opening for receiving a plant between the tube, the front wall and the base wall when the cup is attached to the tube; and
    wherein at least a portion of the base wall and the at least one prong extend into the tube when the cup is attached to the tube.

2. The hydroponic tower of claim 1, wherein the plurality of cups are arranged along the tube into at least a first group of cups that are coplanar along an axis traverse to a longitudinal axis of the tube and a second group of cups that are coplanar along the longitudinal axis of the tube, wherein the first group and the second group are offset from each other along the longitudinal axis of the tube.

3. The hydroponic tower of claim 2, wherein the first group is angularly offset from the second group.

4. A hydroponic tower comprising:
    a substantially vertically-oriented tube having an inlet end and a drain end, wherein the tube defines a plurality of openings; and
    a plurality of cups arranged on the tube such that at least a portion of the cups are removably attached to a respective opening of the plurality of openings in the tube;
    wherein at least a portion of the plurality of cups include a substantially planar front wall spaced apart from the tube when attached to the tube, a resilient first side wall, a resilient second side wall extending from the front wall, and a base wall including at least one prong extending transversely and upwardly therefrom for receiving a plant, wherein the first side wall and the second side wall are spaced apart by an open back side of the cup;
    wherein the plurality of cups include means for removably attaching the cups to the tube with an interference fit that is actuated by reducing a width of the open back side by moving the first side wall and the second side wall towards each other and inserting at least a portion of the cup in the tube;

and wherein at least a portion of the base wall and the prong extend into the tube when the cup is attached to the tube.

5. The hydroponic tower of claim 4, wherein the first wall and the second wall include a proximal end adjacent the front wall and a distal end extending into the tube.

6. The hydroponic tower of claim 5, wherein the distal end of the first wall includes a first catch and the distal end of the second wall includes a second catch.

7. The hydroponic tower of claim 6, wherein the first side wall and the second side wall are resiliently movable such that the first catch and the second catch move towards each other.

8. The hydroponic tower of claim 7, wherein the first catch and the second catch are spaced apart by the open back side of the cup.

9. The hydroponic tower of claim 8, wherein the first catch and the second catch extend into the tube when the cup is attached to the tube.

10. The hydroponic tower of claim 9, wherein the front wall is angled with respect to a longitudinal axis of the tube to define an opening between the tube and the front wall when the cup is attached to the tube.

\* \* \* \* \*